United States Patent Office 3,460,927
Patented Aug. 12, 1969

3,460,927
PROCESS FOR GLASS STRENGTHENING
Hellmuth Georg Fischer, Toledo, and Augustus W. La Due, Maumee, Ohio, assignors to Owens-Illinois, Inc., a corporation of Ohio
No Drawing. Filed May 25, 1966, Ser. No. 552,716
Int. Cl. C03c 21/00, 17/08
U.S. Cl. 65—30       9 Claims

ABSTRACT OF THE DISCLOSURE

A process of treating an inorganic glass or glass-ceramic article to improve its flexural strength by (1) heating the article containing a multivalent chemical element (preferably of an oxide) in its higher valence state, (2) contacting the surface of the article at a temperature below the strain point of the glass with a reducing material such as hydrogen to change the multivalent element such as manganese from its higher valence state to its lower valence state, it having a larger ionic radius in the lower valence state, to thereby produce a compression stress layer on the surface of the article.

---

This invention relates to a process for treating articles of glass, including glass components of articles, to improve the strength of the glass article and also relates to the article resulting from the treatment by the process.

As used herein, the term "glass" means those in organic silicate glasses that (1) are not controllably crystallizable, and thus can be devitrified as the term is normally used, to form crystalline material usually in a matrix of a glass having a composition determined by the initial composition and by the composition of the crystalline material; or (2) are controllably crystallized by a heat treatment.

As pointed out by M. E. Nordberg et al. in their article entitled, "Strengthening by Ion Exchange," published in the Journal of the American Ceramics Society, vol. 47 (May 1964) at p. 215, glass has been strengthened by thermal tempering. The article also indicates that glass can be strengthened by exchange of ions of one chemical element in a surface layer of a glass article with ions of a different chemical element.

When the replacing ion is larger than the replaced ion, the temperature of the glass during the ion exchange should be below the strain point. The stress produced by the larger ion replacing the smaller ion is not relieved so that a surface compressive stress layer is formed.

In the other strengthening method a larger metal ion in the surface layer of the glass is replaced by a smaller metal ion. The temperature of this exchange is to be at a temperature either below the strain point of the glass or above the strain point but below the softening point of the glass. If this latter process of exchange of ions is performed below the strain point, the article is heated then to a temperature sufficiently above the strain point to heal strength-reducing minute cracks that have been formed during the ion-exchange treatment. These cracks are formed because of the difference in expansion coefficient of the main body of the glass article and that of the surface layer that now has a different composition and a lower expansion due to the ion exchange. Thereafter the article is cooled to room temperature. The surface layer with its lower expansion coefficient, as compared with that of the interior glass, is under compressive stress.

Examples of the former chemical strengthening process are found in the paper by S. S. Kistler in the Journal of the American Ceramic Society, 45, No. 2, at pp. 59–68, and Research Corporation's British Patent No. 917,388. These describe an ion exchange process for replacing one alkali metal ion with another one having a larger ionic radius. U.S. Patent No. 2,779,136 discloses the other ion-exchange process in which the smaller alkali metal ion replaces a larger alkali metal ion.

It is an object of the present invention to provide a process of treating a glass article to improve its flexural strength without substituting one metal ion in the glass with an ion of a different chemical element.

It is a further object of this invention to provide a process for treating a glass article in which the flexural strength of the glass is increased by the change of valence of a multivalent cation, and such cation can be present in the main body of the glass or not.

It is an object of the present invention to provide a glass article having a main body and an integral surface layer, a portion of the surface layer having compressive stress and the surface layer containing a multivalent element capable of existing in a lower valence state and a higher valence state, the element having a larger ionic radius in said lower valence state than in said higher valence state.

It is an object of the present invention to provide a process for treating a glass article to increase its flexural strength and the article itself, the process comprising the steps of heating a glass article containing a multivalent element in its surface layer, and containing the surface of the glass article below its strain point with a material that is capable of changing the valence of the multivalent element whereby it has a larger ionic radius and hence places the surface layer in compressive stress.

These and other objects will be apparent from the description that follows.

The process of the invention comprises the treatment of an article of a suitable glass by contact of the glass at an elevated temperature with a material that will change the valence of at least one chemical element in the glass to a lower valence in a surface layer only of the glass article. The elevated temperature is at least 200° C., preferably at least 350° C., and preferably is below the strain point of the glass. The time of treatment can vary widely between minutes and many hours and depends upon the glass composition and the material being used to change the valence of the chemical element, the amount and concentration of such chemical element to be reduced in valence, the desired depth of surface layer in which such change is to be made, and the temperature used.

One of the materials that can be used to reduce the valence of the chemical element is hydrogen which may be used in undiluted form or mixed with a minor proportion, less than 50% by volume, of an inert gas, i.e., a gas that does not adversely affect the reducing action of hydrogen on the valence of the chemical element. When hydrogen is used as the reducing material alone and in such mixture of gases, an illustrative time of treatment is between 2 and 10 hours. When the gas is used at superatmospheric pressure, e.g., up to 100 p.s.i.g., the time of treatment is shorter for a specific amount of valence reduction as compared with using the gas at atmospheric pressure.

The glass used in the process of the present invention is required to contain a chemical element that is capable of existing in two or more valences and is present in the glass structure in at least one of these valence states. Such element is conventionally referred to as a component of the glass expressed as its oxide. This chemical element has at least two valence states of different ionic size, commonly referred to as ionic radius of ions of such element in those valence states. There are many chemical elements that at a lower valence state as an ion have a larger ionic radius than their ionic radius at higher valence state. Many such elements are present in various glass compositions. Some of them are introduced into glass as fining agents. Some are introduced for the purpose of imparting color. The glass used in the process of the present invention contains at least 0.5 mole percent, preferably at least one mole percent, expressed as oxide, of at least one of such chemical elements.

The total content of such chemical elements in a specific glass is not required to be in their higher valence states. Each such chemical element present in its higher valence state may be present also in its lower valence state. As seen below, a very small percentage of the chemical element in its higher valence state can be present with the element in larger concentration in its lower valence state and yet be effective in improving the flexural strength of the glass by treatment of the glass by the present process.

The initial glass may contain this chemical element entirely in its lower valence state. In such case, by one embodiment of the invention, at least part of such chemical element is converted at least in a surface layer of the article to a higher valence state of smaller atomic radius prior to the treatment in which the chemical element is changed from the higher valence state to a lower valence of larger ionic radius in the surface layer only of the glass article.

The ionic radii of many chemical elements, particularly metal ions at two or more valence states have been reported in the literature. These values indicate that there are many multivalent chemical elements, i.e., elements having more than one valence as cations or positive ions, that have larger ionic radius in a lower valence state than the ionic radius in a higher valence state. Examples of such elements are: manganese, antimony, germanium, tin, lead, iron, copper, titanium, vanadium, cerium, arsenic and phosphorus.

Jacob Kleinberg et al., in their book entitled "Inorganic Chemistry" and published in 1960 by Heath in Boston, Mass., present ionic radii values in Angstrom units (A.) for multivalent elements having at least two cations, i.e., positive ions of different valence states as follows:

| Element | Higher valence | | Lower valence | |
|---|---|---|---|---|
| | Number | Radius, A | Number | Radius, A |
| Ti | 4 | 0.68 | 2 | 0.85 |
| Mn | 3 | 0.66 | 2 | 0.78 |
| Fe | 3 | 0.64 | 2 | 0.76 |
| Co | 3 | 0.63 | 2 | 0.74 |
| Zr | 3 | 0.82 | 2 | 0.90 |
| Ce | 4 | 1.01 | 3 | 1.14 |
| Ce | | | 2 | 1.27 |
| As | 5 | 0.46 | 3 | 0.69 |
| Sb | 5 | 0.63 | 3 | 0.92 |
| Bi | 5 | 0.75 | 3 | 1.08 |
| Ge | 4 | 0.53 | 2 | 0.84 |
| Sn | 4 | 0.71 | 2 | 1.10 |
| Pb | 4 | 0.84 | 2 | 1.21 |
| V | 3 | 0.69 | 2 | 0.80 |

The ionic radius of the element in the lower valence state of these elements ranges between about 10 to 60% larger than that of the higher valence state. For comparison, in the alkali metal ion exchange sodium ion is 34% larger in radius than lithium ion and potassium ion is 40% larger in radius than sodium ion.

In the main embodiment of the invention, the glass article initially has a sufficient concentration of at least one of such multivalent chemical elements in a higher valence state, that the treatment merely involves in a surface layer only of the glass the reduction of at least part of the chemical element from such higher valence state to the larger ion of lower valence state. However, some glasses containing such chemical element as part of annealing point of the glass. The glass is maintained at the glass structure, expressed as oxide, have this element present only or substantially only in its lower valence strate. To provide a sufficient concentration of that element in its higher valence state for reduction at the elevated temperature below the strain point of the glass, to improve the flexural strength of the glass article, one embodiment of the invention includes a pretreatment under oxidizing conditions in which the glass is raised to and maintained at an elevated temperature that is above the strain point and below the softening point of the glass. Preferably, this temperature is at least that of the annealing point of the glass. The glass is maintained at the elevated temperature for a sufficient period of time under oxidizing conditions to convert, in the surface layer only of the glass, at least part of that chemical element to a higher valence state. The glass article is then cooled to a temperature below the strain point and subsequently treated for reduction of at least some of those ions in the surface layer to the lower valence state. The conversion to the higher valence is provided preferably by contact with oxygen or an oxygen-containing gas, such as air.

In his book entitled "Glass Engineering Handbook," second edition, published in 1958 by McGraw-Hill Book Company, Inc., New York, N.Y., E. B. Shand defines on pp. 21 and 22 the term "annealing point" as the temperature at which the internal strains in glass are reduced to an acceptable limit in 15 minutes and that the glass at this temperature has a viscosity of $10^{13}$ poises. He states it is determined by a test (ASTM Desig. C336–54T) which is made with a weighted glass fiber in a furnace cooled at a rate of 4° C. per minute. The annealing-point temperature is determined from rates of elongation of the fiber. That book on p. 22 states that the term "strain point" is the temperature at which the internal stresses are reduced to low values in four hours. At this viscosity, which is $10^{14.5}$ poises, the structure of the glass is substantially rigid. The data for determining the strain point are obtained by using the same procedure that is used for the annealing point, but for a slower rate of fiber elongation. On p. 21 Shand states that the "softening point" is the temperature, well above the annealing range, at which glass will deform under its own weight. It is tested (ASTM Desig. C338–54T) by placing an unweighted glass fiber in a special furnace with its temperature increasing at a rate of 5° C. per minute. The softening point corresponds to a certain rate of elongation. The corresponding viscosity varies slightly with the density of the glass. At this temperature the viscosity is $10^{7.5}$ to $10^{8.0}$ poises.

In the following examples reference is made to the flexural strength under the term "modulus of rupture." The flexural strengths were determined using a Tinius-Olson testing machine. This machine applies a measured load through a single knife edge to the center of the sample rod supported on two knife edges that are four inches apart (3-point loading). The load is applied at a constant rate of 24 lbs. per minute until failure occurs with a marker indicating the highest load applied to the point of failure. A dial micrometer calibrated in inches and equipped with a bar contact instead of a point contact was used to measure the maximum and minimum diameters at the center of the sample to an accuracy of 0.0005 inch. Since few sample rods are perfectly round, the load is applied normal to the maximum diameter and the standard formula for an elliptical cross-section is used in calculating the moduus of rupture (MR) as follows:

$$MR = \frac{(10.185) \times \text{Load}}{D_1^2 \times D_2}$$

The modulus of rupture in this formula gives the flexural strength in pounds per square inch of cross-sectional area at failure.

The sample rods were prepared by cutting glass cane into 5-inch long rods which had a diameter of about $\frac{3}{16}$ inch. The glass cane was made by pulling it from molten glass.

EXAMPLE I

Molten glass was prepared in a furnace in a conventional manner, in an oxidizing atmosphere. The theoretical composition of this glass on a mole percent basis, expressed as oxides, was:

| | |
|---|---|
| $SiO_2$ | 70.3 |
| $Al_2O_3$ | 4.3 |
| $Na_2O$ | 10.1 |
| $K_2O$ | 1.3 |
| $CaO$ | 6.5 |
| $MgO$ | 6.3 |
| $Mn_2O_3$ (total manganese content expressed as manganic oxide) | 1.2 |

This glass had a dark purple color due to the presence of $Mn_2O_3$. The ratio of manganese in its divalent and trivalent state was not determined. If the glass had contained only manganese in its divalent state, i.e., MnO, it would not have had a color. This glass had a strain point of 545° C., and an annealing point of 615° C.

Sample rods of this glass, that were previously annealed, were placed in a furnace maintained at a temperature of about 445° C., i.e., 100° C. below the strain point of the glass. At this temperature they were in contact in the furnace with hydrogen of commercial purity from a conventional tank of hydrogen for 9 hours. The hydrogen gas in the furnace was at atmospheric pressure. The rods were then removed from the furnace and cooled slowly. The modulus of rupture of other annealed rods and modulus of rupture of the glass rods subjected to the foregoing treatment at an elevated temperature with hydrogen were determined. The hydrogen-treated rods had an average modulus of rupture 40% above that of untreated annealed rods. The surface layer of hydrogen-treated rods had been decolored and a slight compressive stress was noted in this surface layer.

EXAMPLE II

A glass of the same basic composition described above for Example I was made, but instead of incorporating manganese oxide there was incorporated antimony oxide in the glass. It constituted 5.96% by weight of the batch as antimony pentoxide. The glass formed contained antimony in both the trivalent and the pentavalent states. The analysis of this glass indicated that of the total content, expressed as antimony pentoxide, only 3.7% by weight, was in that higher valence state. Sample rods previously annealed were treated in the furnace by contact with hydrogen at atmospheric pressure for 9 hours at 400° C. (145° C. below strain point), and then cooled. Subsequent strength determinations showed a 38% higher modulus of rupture than untreated, annealed sample rods of that glass.

There are many glass compositions in the literature that show as part of the composition ions of chemical elements that have at least two valence states. By treatment in accordance with the process of the present invention such element in the glass in its surface layer can be converted to a greater proportion, if necessary, to the higher valence state by an oxidizing treatment, as described above, followed by reduction of part of that element in the surface layer only to a larger ion of lower valence at a temperature below the strain point of the glass by the reducing action as described and illustrated above.

Lead is such an element that is common in many glasses. In Table 1-1 on p. 4 of his book, Shand shows glass compositions that contain substantial percentages of lead oxide content. W. A. Weyl et al. in their book entitled "The Constitution of Glass," vol. I, published in 1962 by Interscience Publishers, a Division of John Wiley & Sons, Inc., New York, N.Y., on p. 225, show a number of chemical elements that are either glass formers or probable glass formers and that have at least two valence states as cations. Obviously, part of such chemical elements can be changed in valence state by means of the present invention. The same book refers to many other oxides that are present in glass and thus refers to other glasses that can be treated in accordance with the process of the present invention.

An oxidizing treatment to convert the chemical element to a higher valence state should be carried on for a period of time that depends upon the amount desired to be converted. An illustrative range of time is from about one to about ten hours. The time is such that there will be this conversion in a surface layer of the desired depth which would be between 2 and 200 microns. The treatment may use oxygen or oxygen-containing gas at superatmospheric pressure, e.g., up to 200 p.s.i.g.

In addition to the many glasses described in the literature that have been made for use as glass in the form of articles, there are other glass compositions that are made primarily for their conversion to glass-ceramics by controlled heat treatment. These glasses are commonly referred to as thermally crystallizable glasses. Examples of one type of thermally crystallizable glass are disclosed in U.S. Patent No. 2,920,971 in which a substantial concentration of titania alone or with a substantial concentration of zirconia is used as nucleant. Another type of thermally crystallizable glass containing a substantial amount of titania as nucleant is disclosed in U.S. Patent No. 3,157,522.

A further type of thermally crystallizable glass is disclosed in U.S. patent application Ser. No. 464,147, filed on June 15, 1965, by Clarence L. Babcock, Robert A. Busdiecker and Erwin C. Hagedorn, with common assignee and entitled "Product and Process for Forming Same." As indicated titania and zirconia are present. Phosphorus is also present as oxide. That patent application also illustrates such glasses with various metal oxides present as colorants in concentrations between 0.005 and 2% by weight. These metal oxides, that are colorants, have more than one valence state. They can be changed from a higher valence to a lower valence by the present invention to improve the flexural strength of the glass provided the colorant is present in a sufficient concentration in the glass as described above.

The thermally crystallizable glass is disclosed in U.S. patent application Ser. No. 352,958, filed on Mar. 18, 1964, now Patent No. 3,380,818, by William E. Smith, with common assignee and entitled "Glass, Ceramics and Method," contains zirconium, titanium, tin and phosphorus expressed as oxides, and thus should be suitable glass for use in the process.

Still a further thermally crystallizable glass composition is one that is disclosed and claimed in U.S. patent application Ser. No. 371,089, filed May 28, 1964, by William E. Smith, with common assignee entitled "Glass, Ceramics and Method." That glass contains 6 to 12% titania which is the oxide of a chemical element that has two valences and thus an article of the glass should be able to be treated by the present process to improve the flexural strength.

The article of the present invention is a main body of glass containing a small amount, i.e., at least 0.5 mole percent of a chemical element, expressed as oxide, such as multivalent metals and having at least two valence states as cation, and an integral surface layer of that glass composition but with a higher concentration of that element in its lower valence state of larger ionic radius than is present in the main body of the glass, i.e., with a higher ratio of the element in its lower valence state to it in its higher valence state than such ratio in the main body. The surface layer has a depth of between 2 and 200 microns.

Hydrogen and hydrogen-containing gas have been mentioned as the valence-reducing material but many other materials, such as aluminum metal, molten stannous chloride, and electron donors, including such electrons provided by electrolysis of the glass separating anodic and cathodic liquids using an intermittent D.C. voltage can be used.

It was stated above that the article of the invention has a higher ratio of the chemical element in its lower valence state to that element in its higher valence state in its surface layer than in the main body of the glass. This is the case when the article has initially a sufficient concentration of the chemical element in its higher valence state throughout the glass. However, when the initial glass is not of this type, the oxidizing step is performed to give the surface layer only the requisite concentration. The subsequent reducing treatment will be effective to improve the strength because the layer will have compressive stress, even though the final article may have the main body with a higher ratio of the chemical element in its lower valence state.

The disclosures of the three copending U.S. patent applications mentioned above are incorporated by reference.

Various modifications of the invention will be apparent to one of ordinary skill in the art from the foregoing description of the invention. The examples have been presented merely for purpose of illustration and not by way of limitation. The invention is limited only by the claims that follow.

We claim:
1. A process of treating an inorganic article of the group consisting of glass and glass-ceramic to improve its flexural strength by providing a compressive stress surface layer thereon, the process comprising the steps of:
   (1) heating the article containing a multivalent chemical element having a higher valence state and a lower valence state at least a part of the element being in its higher valence state and the lower valence state thereof having an ionic radius larger than the ionic radius of the higher valence state, the heating being at an elevated temperature below the strain point of the inorganic article, said chemical element being present in the concentration of at least 0.5 mole percent, expressed as oxide, of the glass composition;
   (2) contacting the surface of the article, while maintained at said elevated temperature below the strain point, with a reducing gas to change the chemical element in said glass from said higher valence state to said lower valence state for a period of time sufficient to reduce, in a surface layer only of the article, at least part of said chemical element in said higher valence state to said lower valence state; and
   (3) cooling the article.

2. The process of claim 1 wherein said reducing gas contains hydrogen in a concentration of at least 50% by volume.

3. The process of claim 1 wherein the chemical element is arsenic.

4. The process of claim 1 wherein the chemical element is manganese and is present at least partially in the initial glass as $Mn_2O_3$ and said reducing gas contains hydrogen in a concentration of at least 50% by volume.

5. The process of claim 4 wherein the gas is hydrogen and wherein the glass consists essentially on a mole basis of about:

| | Percent |
|---|---|
| $SiO_2$ | 70.3 |
| $Al_2O_3$ | 4.3 |
| $Na_2O$ | 10.1 |
| $K_2O$ | 1.3 |
| CaO | 6.5 |
| MgO | 6.3 |
| $Mn_2O_3$ (total manganese content expressed as manganic oxide) | 1.2 |

6. The process of claim 5 wherein the elevated temperature is substantially 445° C. and the contact time is substantially 9 hours.

7. The process of claim 6 wherein the chemical element is antimony present as antimony trioxide and antimony pentoxide.

8. A process of treating an article of glass to improve its flexural strength by providing a compressive stress layer thereon which comprises:
   (1) heating a glass article containing an oxide of a multivalent chemical element having a higher valence state and a lower valence state, at least part of the element being in its higher valence state and the lower valence state having an ionic radius larger than the ionic radius of the higher valence state, the heating being at an elevated temperature above the strain point of the glass, said chemical element being present in the concentration of at least 0.5 mole percent, expressed as oxide, of the glass composition;
   (2) contacting the surface of the glass article, while maintained at said elevated temperature above the strain point, with an oxidizing material to change the chemical element in said glass from said lower valence state to said higher valence state for a period of time sufficient to oxidize, in a surface layer only of the glass article, at least part of said chemical element in said lower valence state to said higher valence state;
   (3) cooling the article to a temperature below the strain point of the glass but still at an elevated temperature;
   (4) contacting the surface of the glass article, while maintained at said elevated temperature below the strain point, with a reducing gas to change the chemical element in said glass from said higher valence state to said lower valence state for a period of time sufficient to reduce, in the surface layer only of the glass article, at least part of said chemical element in said higher valence state to said lower valence state; and
   (5) cooling the article.

9. The process of claim 8 wherein the oxidizing material is a gas consisting essentially of oxygen, the reducing gas is hydrogen, and the elevated temperature above the strain point is at least that of the annealing point of the glass.

References Cited

UNITED STATES PATENTS 2,339,928   1/1944   Hood _____ 65—30

OTHER REFERENCES

Kistler, S. S.: "Stresses in Glass Produced by Non-Uniform Exchange of Monovalent Ions," J. of Amer. Cer. Soc., vol. 45, No. 2, February 1962, pp. 59–68.

S. LEON BASHORE, Primary Examiner

JOHN H. HARMON, Assistant Examiner

U.S. Cl. X.R.

65—32, 33